Patented Oct. 25, 1949

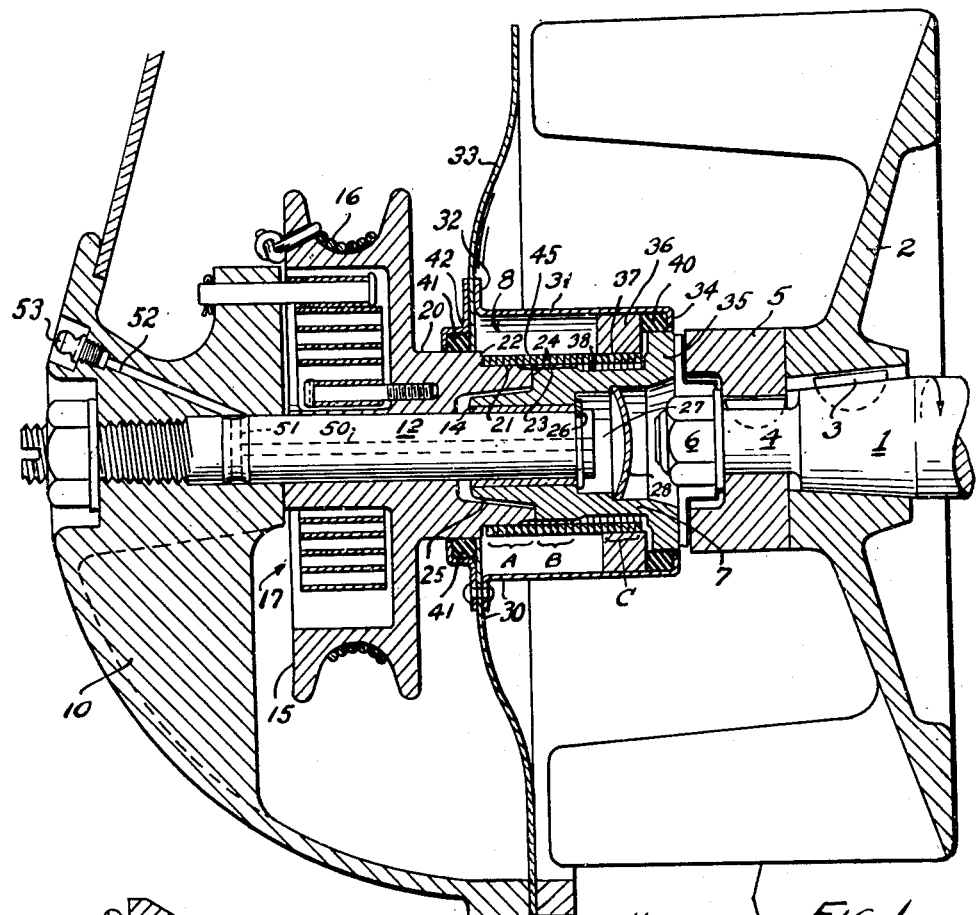
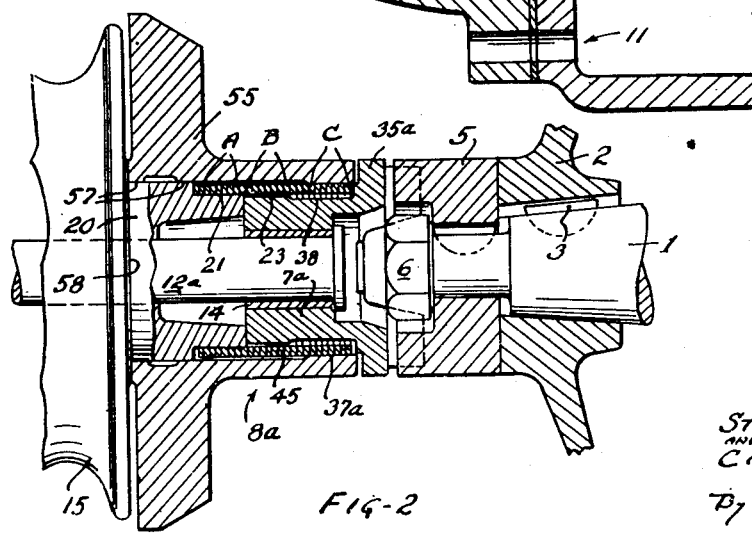
INVENTORS
STANLEY F. GORSKE
AND
CARL P. PEPPER

2,486,149

UNITED STATES PATENT OFFICE 2,486,149

SPRING CLUTCH AND ENGINE STARTER MECHANISM

Stanley F. Gorske, Indianapolis, and Carl P. Pepper, Plainfield, Ind., assignors to L. G. S. Spring Clutch Corporation, Indianapolis, Ind., a corporation of Indiana Application December 27, 1948, Serial No. 67,522

7 Claims. (Cl. 123—185)

The invention relates to improvements in spring clutch mechanisms and in starter mechanisms for internal combustion engines, which starter mechanisms include spring clutches, thus indicating the principal objects.

Considered as an improvement in engine starter mechanisms the invention aims to provide an improved starter unit having (e. g.) a manually operable driving member such as a lanyard-supporting wheel or a crank, a very simple clutch spring with coils frictionally secured to a drum of the driving member; having coils extending therebeyond for gripping a coaxial driven drum continually coupled with the load (i. e. engine crankshaft) and other coils beyond the driven-drum-gripping coils and continually bearing frictionally on a clutch energizing and backfire release drum which may be part of a free-turning inertia member like a flywheel or a permanently non-rotative part of the mechanism. The invention resides principally in the simplification of the clutch spring and its cooperating parts while (a) insuring transmission of starting torque to the engine; (b) insuring immediate release of the driving or cranking mechanism when the engine starts or in case it backfires; (c) enabling easy return of the driving mechanism to an initial idle position after each actuation; and (d) minimizing or eliminating wear and heating of the starter unit parts and wastage of engine power during normal operation. The above indicates further objects hereof. Others will be made apparent below.

In the drawing, Fig. 1 is a central longitudinal sectional view of one form of starter unit in operative association with the crankshaft (partially shown) of a typical light duty internal combustion engine. Fig. 2 similarly shows the clutch and associated parts of a modified form of starter unit.

The illustrated portion of the engine crankshaft 1, Figs. 1 and 2, carries a flywheel 2 keyed thereon at 3. The reduced end 4 of the crankshaft has a driving head 5 similarly keyed thereto and secured by a threaded nut 6. The head 5 is part of a conventional readily detachable jaw or other positive coupling, the cooperating part of which is formed on the driven element or member 7 of the improved clutch assembly 8. The clutch assembly may thus be self-contained and readily drivingly coupled with and disconnected from the crankshaft as a complete unit separate from the engine mechanism.

The clutch assembly 8, as shown only in Fig. 1, may be carried on a main mounting frame or bracket 10 forming, in effect, part of the engine housing as by being detachably fitted thereto at a series of bolt or screw receiving holes, one of which is indicated at 11 (fastener not shown). The bracket 10 rigidly carries a stiff non-rotating stud or dead axle 12 which rotatably supports the driven element 7 through the intermediary of a bearing bushing 14. A cooperating driving or starter wheel 15 resembling a pulley and having a flexible lanyard 16 wound thereon is also rotatably carried by the stud 12. A conventional retriever spring assembly 17 inside the wheel rewinds the lanyard after each engine-starting pull thereon.

The starter wheel 15 has a cylindrical hub portion 20 and, therebeyond toward the engine, a reduced diameter cylindrical clutch drum surface portion 21 terminating leftwardly at a smooth shoulder 22 on the hub. The driven member 7 has a similar but preferably slightly smaller cylindrical drum surface portion at 23 and drum-end-defining smooth shoulder 24 normally in slightly spaced relation to the smooth inner end of the driving drum portion of the starter wheel. The two drums 21 and 23 should be of exactly the same diameter at their adjacent ends as shown in Fig. 1 since the highest loading of the clutch spring is at the "crossover" region in the double drum type of clutch herein shown. For that purpose the right hand end of the drum 21 is shown reduced gradually, for a distance of approximately two coil widths, to the diameter of drum 23. The driving hub and member 7 may be in loosely telescoping relationship at 25 to accommodate the desired length of bearing bushing 14 and to provide oil channeling as will be described later. The two drum elements 21 and 23 are maintained in the desired relationship axially by a snap ring 26 on the stud 12 within a socket 27 of the driven member 7, which socket is sealed by an expansion disc type plug 28 after insertion of the stud 12 during assembly.

A clutch housing assembly 30 comprises, as shown, a sleeve 31 flanged outwardly at 32 for attachment to a mounting plate 33 secured rigidly to the engine housing as apparent from the drawing, the sleeve being flanged inwardly at 34 around a disc-like smooth cylindrical inner end portion 35 of the driven member 7. The shell 31 non-rotatively supports a rigid metal clutch energizing and release reactance ring 36, the purpose of which will be later explained. The ring 36 has an inner cylindrical drum surface 37 in concentric spaced relation to a somewhat reduced diameter or neck portion 38 of the driven member 7 of the clutch.

An oil seal ring 40 is contained by the clutch housing sleeve 31 between the reactance ring 36 and flange 34 so as to bear on the smooth disc portion 35 of driven member 7. A similar oil seal ring 41 is supported between the plate 33 and a cap 42 thereon in peripheral contact with the smooth hub 20 of the starter wheel.

Assuming the engine operates clockwise as viewed from the front of the engine, the clutch spring 45 is left-hand wound, comprising simply a series of equal diameter coils. Preferably the clutch spring has its ends finished parallel to each other (as by end grinding) for location of the clutch spring loosely in working position by the smooth shoulder 22 and a similar shoulder on the disc-like head 35.

The coils A surrounding the driving drum 21 are somewhat expanded thereon in assembly, i. e. in interference fitting relation thereto for self-energization of the coils at the driving end of the spring into tight gripping relation to the driving drum. The coils B surrounding the driven drum 23 are preferably normally free therefrom as indicated. The coils C inside the non-rotating reactance ring 36 are in interference fitting relation to said ring, the amount of contraction of the coils necessary to insert them in the ring depending upon the stiffness of the spring stock and initial proximity of the (e. g. normally free) center coils to the driven drum 23. If those center coils normally bore on the drum 23 then that drum would (in the assembly as shown) remain in overrunning contact therewith during all the time the engine is in operation.

In operation, turning of the starter wheel 15 in the indicated direction through manipulation of the lanyard 16 causes the rightward coils C of the clutch spring to drag on the drum surface of ring 36 (in overrunning relation thereto), thereby serving as reactance to cause clutch spring "energization" or contraction of the normally free center coils B into clutching engagement with the driven drum 23 to start the engine. As the engine commences to operate under its own power the drum 23 overruns against the coils B so long as the operator continues to pull on the lanyard. When the lanyard is released and the wheel 15 is returning or has returned to initial position the intermediate coils B automatically release the drum 23 by expanding to their normal diameters. The drum 23 can then turn continually with the engine crankshaft 1 without generating any heat in the clutch. During the return of the starter wheel 15 to initial position by the retriever mechanism 17 after each starting impulse the stationary ring 36, in snubbing or automatically energized relationship to the coils C by reason of the direction in which the spring is wound and of the interference fitting of the coils C in the ring, serves as reactance to enable reverse overrunning of the driving drum 21 of the starter wheel in the coils A which in turn expands the coils B to assist in the release of the drum 23 therefrom.

If the engine backfires, during starting, the snubbing or self-energized expanding action of the coils C on the stationary reactance ring 36 prevents reverse rotation of the starter wheel through the intermediary of the contracted clutching coils A and B even though the operator maintains sufficient pull on the lanyard to maintain the coils B in contact with the driven drum 23. Actually whenever a backfire occurs the engine exerts an instantaneous overcoming torque or jerk on the starter wheel, causing occurrence of enough slack in the lanyard to enable the coils B to expand clear of the driven drum 23. Those coils B, in event of backfire, could not remain in tight gripping or true spring-clutching relation to the driven drum, even though the coils were normally in interference-fitted contact therewith, because of the positive restraining hence deenergizing action of the powerfully snubbed coils C on the clutching coils B.

Provision for lubrication of the starter clutch unit separate from the engine lubrication system is shown only in connection with Fig. 1, such provision however being applicable to Fig. 2 without substantial modification. Oil may be introduced to the socket or chamber 27 in the driven drum member 7 through the stud 12 as by provision of a suitable axial duct 50 and connecting passages 51, 52 with an oil fitting 53 on the frame part 10. Egress of oil from the chamber 27 except along the bearing bushing 14 is blocked by the plug 28. Oil which goes through the bushing is conducted to the clutch drum surfaces via the slight gap at shoulder 24 between the clutch drums. Escape of oil from the space around the clutch spring is blocked by the seals 40 and 41. The arrangement enables maintenance of the proper type and quantity of lubricant for efficient spring clutch operation regardless of the type and quantity provided for the engine.

Referring to Fig. 2 the construction and arrangement of the principal clutch and other parts for coupling the starter wheel 15 to the crankshaft 1 are the same as already described in connection with Fig. 1, the parts being similarly identified. Instead of the stationary reactance ring 36 a rotatable but normally stationary inertia wheel or weight 55 of very substantial mass is provided on which the clutch-spring-engaging reactance surface (37a, corresponding to ring surface 37) is formed. A substantially free bearing support for the wheel is provided at 57 around the hub 20 of the starter wheel. The disc portion 35a of the driven drum member 7a and a shoulder 58 on the starter wheel locate the inertia wheel against undesirable axial movement. The coils B of the Fig. 2 assembly preferably have practically no initial or normal drag on the drum 23.

In the mechanism according to Fig. 2 the mass of the inertia wheel 55 is sufficiently great (in relation to the flexure resistance of the clutch spring and the degree it has to be flexed torsionally in order to grip the driven drum 23) so that operation of the lanyard at average speed will cause the spring coils B to be maintained in gripping contact with the drum surface 23 for starting the engine. For that purpose the mass of 55 has to be several pounds, and if the supporting bearings are on a rotating portion of the unit they must be free running. The clutch spring movement must be quite flexible, e. g. of wire stock not materially larger in cross section than as illustrated or else made especially flexible as by transverse slotting or the like (not shown).

Operation of the Fig. 2 arrangement to start the engine is essentially the same as described in connection with Fig. 1 as will be apparent.

When engine backfire occurs the inertia wheel 55, although free to lag by overrunning at coils C. is ordinarily turning fast enough to have attained considerable momentum. The backfire would have first to reduce the kinetic energy to zero before it could impart any reverse torque to the starter wheel through the spring clutch. Thus the backfire release on part of the Fig. 2 construction is very positive since, because of the momentum usually attained by the wheel 55, the coils C lock against the wheel surface 37a and begin to unwind and deenergize the coils B even before the actual backfire reversal of the crankshaft occurs.

While the spring clutch mechanism shown herewith employs a contracting-to-grip type of clutch spring (on drums 21 and 23) the parts can, of course, be relatively reversed for accommodating and utilizing an expanding-to-grip type of clutch spring.

We claim:

1. An engine starter mechanism of the type having a rotary member permanently associated with the engine crankshaft and adapted to be turned in one direction from an initial position for starting the engine and be returned automatically to initial position after each starting impulse, said mechanism comprising a circular driving clutch drum permanently coupled with said rotary member, a coaxial circular driven clutch drum adjacent the driving drum and connected with the crankshaft for imparting starting torque thereto, a circular brake drum coaxial with the clutch drums, and a helical clutch spring bridging the three drums and having relatively reversely acting one-way-locking i. e. overrunning and snubbing friction connections with the driving drum and brake drum respectively for causing clutching and release of the spring coils relative to the driven drum consequent upon turning of the driving drum in the engine starting and return directions respectively, the overrunning connection of the spring with the driving drum enabling said rotary member to be returned immediately toward said initial position after each engine-starting impulse.

2. The starter mechanism according to claim 1 wherein the brake drum is carried by a freely journalled inertia member of sufficient mass in relation to the stiffness of the clutch spring so that when the driving drum is turned suddenly the spring coils associated with the driven clutch drum are caused to grip and turn that drum.

3. The starter mechanism according to claim 1 including stationary means connected to the brake drum and operating to prevent the brake drum from turning.

4. The starter mechanism according to claim 1 wherein the driven drum is permanently coupled with the engine crankshaft and the clutching coils of the spring located for friction contact with the driven drum are free therefrom in a relaxed condition of the coils, whereby the driven drum and said coils are not subjected to overrunning heat during operation of the engine after starting.

5. An engine starter mechanism of the type having a rotary member permanently associated with the engine crankshaft and adapted to be turned in one direction from an initial position for starting the engine and be returned automatically to initial position after each starting impulse, said mechanism comprising a circular driving clutch drum permanently coupled with said rotary member, a coaxial circular driven clutch drum adjacent the driving drum and connected with the crankshaft for imparting starting torque thereto, a circular brake drum coaxial with the clutch drums, and a helical clutch spring normally of approximately cylindrical form from end to end bridging the three drums and having relatively reversely acting one-way locking i. e. overrunning and snubbing friction connections with the driving drum and brake drum respectively for causing clutching and release of the spring coils relative to the driven drum consequent upon turning of the driving drum in the engine-starting and return directions respectively, the overrunning connection of the spring with the driving drum enabling said rotary member to be returned immediately toward said initial position after each engine-starting impulse.

6. An internal combustion engine starter unit of the class described comprising a frame adapted to be secured to an engine housing, a dead axle carried rigidly by the frame for alignment with the engine crankshaft, a starter wheel journalled on the dead axle, a driving clutch drum on the wheel, a driven clutch drum journalled on the dead axle adjacent the driving clutch drum, means on the driven drum adapted for driving connection thereof with the engine crankshaft, a clutch spring telescoping the clutch drums, tight on one of the drums and adapted to grip the other to start the engine, the spring having free coils extending beyond said other drum away from said one drum, a housing for the clutch around the drums and spring, and means supported by the housing and in friction contact with one of said free coils for causing gripping and releasing operations of the spring on starting and in event of engine backfire respectively.

7. The mechanism according to claim 6 wherein the clutch housing has oil seal connections with the starter wheel and driven drum, the dead axle has a duct lengthwise thereof for leading oil to the journal of the driven drum, and cooperating means associated with the drums carries oil therefrom to the clutch surfaces and clutch spring.

STANLEY F. GORSKE.
CARL P. PEPPER.

REFERENCES CITED

The following references are of record in the file of this patent:

UNITED STATES PATENTS

| Number | Name | Date |
|---|---|---|
| 1,983,824 | Starkey | Dec. 11, 1934 |

FOREIGN PATENTS

| Number | Country | Date |
|---|---|---|
| 168,195 | Germany | Mar. 6, 1906 |